(12) United States Patent
Rousseau

(10) Patent No.: US 8,100,367 B1
(45) Date of Patent: Jan. 24, 2012

(54) VARIABLE GEOMETRY WING USING A ROLL-UP DEVICE

(75) Inventor: David G. Rousseau, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 276 days.

(21) Appl. No.: 12/552,193

(22) Filed: Sep. 1, 2009

(51) Int. Cl.
 *B64C 3/54* (2006.01)
(52) U.S. Cl. ...................................... 244/218
(58) Field of Classification Search .................. 244/218, 244/201, 198, 123.1, 900, 901
 See application file for complete search history.

(56) References Cited

U.S. PATENT DOCUMENTS

| | | | | |
|---|---|---|---|---|
| 3,135,482 A | * | 6/1964 | Ghard | 244/218 |
| 3,269,673 A | * | 8/1966 | Reiniger | 244/218 |
| 4,685,410 A | * | 8/1987 | Fuller | 114/39.31 |
| 4,744,534 A | * | 5/1988 | Corbett | 244/218 |
| 5,052,641 A | * | 10/1991 | Coleman | 244/218 |
| 5,711,496 A | * | 1/1998 | Nusbaum | 244/214 |
| 6,241,195 B1 | * | 6/2001 | Wagner, III | 244/218 |
| 6,899,298 B2 | * | 5/2005 | Lee | 244/46 |
| 2003/0168556 A1 | * | 9/2003 | Lee | 244/218 |

* cited by examiner

*Primary Examiner* — Christopher P Ellis
(74) *Attorney, Agent, or Firm* — Ryan J. Friedl; Kyle Eppele

(57) ABSTRACT

A system includes a fabric wing, such as a Rogallo wing or parafoil, a roller connected to the fabric wing, cables connected to the fabric wing, a motor connected to the roller. Upon activation, the motor causes the roller to roll-up or unroll at least a portion of the fabric wing. The system may include a rigid or collapsible roller support structure connected to the roller. The roller may be located along a central axis of the fabric wing. A control unit may be connected to the cables, the control unit including a logic controller, power source, communications system, GPS and inertial navigation sensor system, motor controller, and one or more sensors including an air speed sensor, altitude sensor, obstacle detection sensor, and/or a ground proximity sensor. The system may include a second roller with an attached motor, with each roller located at an end of the fabric wing.

21 Claims, 6 Drawing Sheets

US 8,100,367 B1

VARIABLE GEOMETRY WING USING A ROLL-UP DEVICE

FEDERALLY SPONSORED RESEARCH AND DEVELOPMENT

The Variable Geometry Wing Using a Roll-Up Device is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil. Reference Navy Case No. 99729.

BACKGROUND

A parafoil is a fabric structure used in high-performance parachute jumping and some powered paraglider vehicles. A Rogallo wing is a triangular fabric delta-wing that is attached to ridged rods or tubes along the leading-edge, with another ridged rod or tube aligned front-to-back (chord-wise) and attached at the front to the leading-edge rods/tubes. It is advantageous to use a parafoil or Rogallo wing because they are light-weight fabric structures that can be folded up for easy carrying or storage and can be readily deployed when needed. A disadvantage of using these fabric wings is that they have a large wing surface area, causing them to operate at low speeds (below 30 mph for a parafoil and below 50 mph for a Rogallo wing). At higher speeds (i.e., above 60 mph), Rogallo wings and parafoils become unstable and/or difficult to control.

Existing parafoil systems rely on air blowing into openings along the leading-edge to inflate the fabric, thereby creating a wing shape. This inflow of air is the result of forward flight, and the air-speed and angle of incidence must be within a specific range in order for the parafoil to operate properly. Therefore, each parafoil is designed to carry a particular weight and fly at a specified speed. Also, because the wing is entirely made of fabric, if the speed, angle of incidence, or weight are exceeded, the wing can collapse. Conventional parafoils cannot operate at high speeds because the fabric begins to flutter and the wing has too much area and produces too much drag. Similarly, conventional parafoils are unable to operate over a wide range of speeds or be easily adapted to carry different weights.

A need exists for a wing that can carry a payload and operate at high speeds without suffering the aforementioned drawbacks.

DETAILED DESCRIPTION OF SOME EMBODIMENTS

Figure 1A:
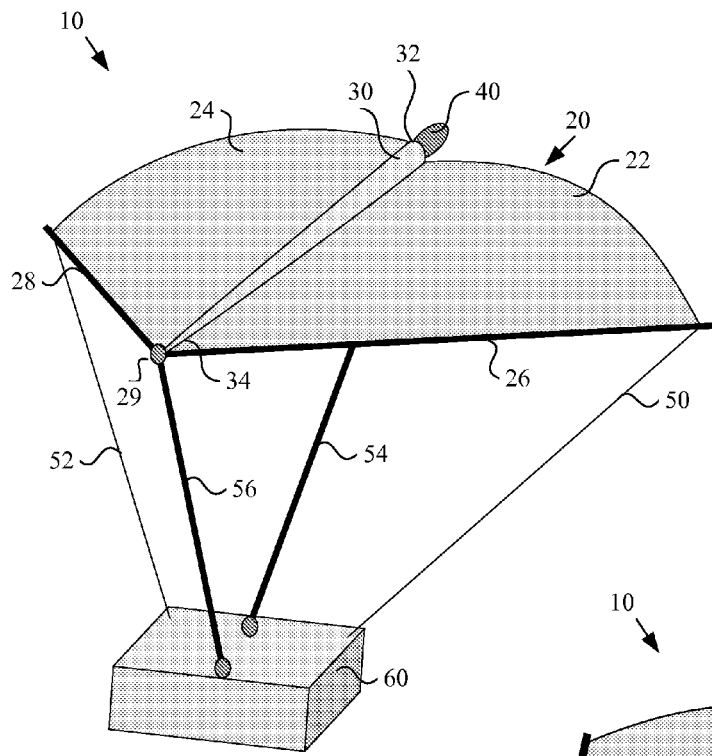
FIGS. 1A and 1B show diagrams of an embodiment of a Rogallo wing shaped single roller system in accordance with the Variable Geometry Wing Using a Roll-Up Device.
Figure 1B:
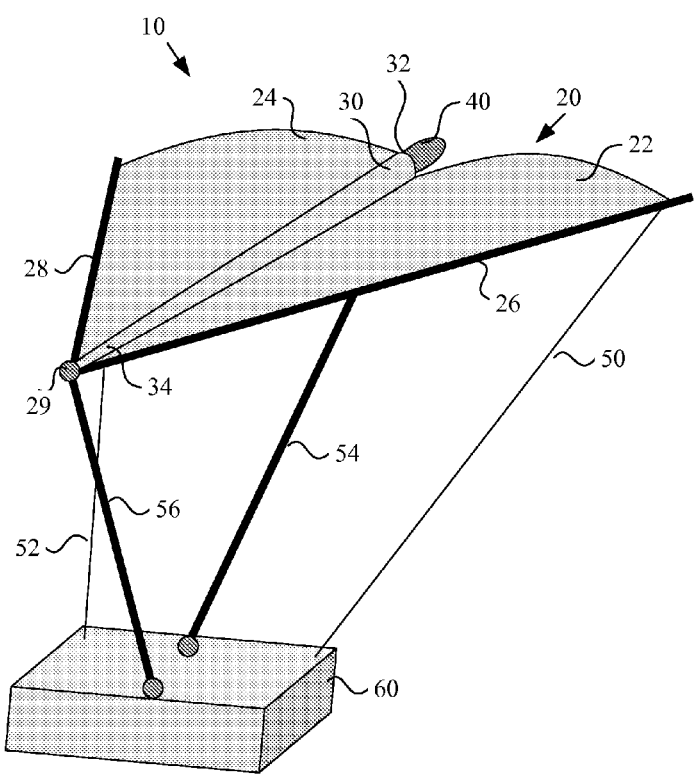

FIGS. 1A and 1B show diagrams of an embodiment of a Rogallo wing shaped single roller system 10 in accordance with the Variable Geometry Wing Using a Roll-Up Device. System 10 may include a fabric wing 20, a roller 30 connected to fabric wing 20, cables 50 and 52 connected to fabric wing 20, and a motor 40 connected to roller 30. Fabric wing 20 may comprise various flexible materials typically used in such wings, such as nylon and nylon/polymer combinations.

In some embodiments, fabric wing 20 comprises a first portion 22 and a second portion 24. In such embodiments, an end of first portion 22 may be connected to the bottom portion of roller 30 and an end of second portion 24 may be connected to the top portion of roller 30. Examples of how such connection may occur include the use of adhesives, ultrasonic welding, sewing, hook-and-loop fasteners, or other mechanical means of permanently or temporarily attaching the fabric wing to the roller. For example, the fabric attachment means may be similar to a type of system used on sail boats where the sail has little "cars" that go into a slot in the mast so the sail can be raised/lowered and still stay "connected" to the mast. In some embodiments, the fabric attachment means may also be similar to a type of system used in sail boats is where the sail has a thick cord embedded along the leading edge, and that cord slides into a slot on the mast. Such a connection may facilitate the rolling and unrolling of fabric wing 20 around roller 30 such that first portion 22 and second portion 24 roll and unroll at the same rate.

For the Rogallo wing of FIGS. 1A and 1B, fabric wing 20 contains rigid tubes 26 and 28 as the leading edges. As an example, tubes 26 and 28 may comprise any light-weight and structurally rigid material such as composite materials like fiberglass or carbon fiber or light-weight metals like aluminum. In these embodiments, tubes 26 and 28 are connected to roller 30 by a hinge 29. As shown, tube 26 is connected to first portion 22 of fabric wing 20, while tube 28 is connected to second portion 24 of fabric wing 20. The use of tubes 26 and 28 as the leading edges of fabric wing 20 helps to eliminate the flutter problems, giving the wing the capability of flying at a wider angle of attack range. The use of a hinge connecting tubes 26 and 28 results in a variable-sweep wing capability, which significantly reduces drag at high speeds.

As changing the wing-sweep of tubes 26 and 28 may result in a change in the center-of-lift of fabric wing 20, the position of the payload may need to be shifted fore or aft to maintain the aerodynamic balance between lift and weight. Such adjustment may be accomplished by rolling or unrolling the cables 54 and 56 attaching the payload to the fabric wing. Such control of the cables may be provided by signals from control unit 60 in conjunction with motors (not shown) coupled to control unit 60 that can vary the cable length.

In "single roller" embodiments, roller 30 is located along a central axis of fabric wing 20. In embodiments having two rollers, each roller may be located at one end of the fabric wing (see for example, FIGS. 3A and 3B). The single roller configuration results in fabric wing 20 being shortened or lengthened when the roller 30 is operated. When fabric wing 20 is rolled up, fabric wing 20 has a lower aspect ratio, less area, and less drag, which allows better high speed operation. Conversely, when fabric wing 20 is fully unrolled, it has more wing area and provides more lift at low speeds. In both the "single roller" and "double roller" configurations, roll control is accomplished by rolling or unrolling the cables 50 and 52 attaching the payload to the fabric wing, and pitch control accomplished by rolling or unrolling the cables 54 and 56 attaching the payload to the fabric wing.

Roller 30 may be tapered from a first end 32 to a second end 34. In such embodiments, motor 40 may be connected to the first end 32, which has the larger diameter. In some embodiments, for reasons of weight and balance it may be desired to connect motor 40 to the second end 34, or two motors may be connected at ends 32 and 34. In some embodiments, roller 30 is connected to fabric wing 20 such that first end 32 is oriented at the trailing edge of fabric wing 20 (as shown in FIGS. 1A and 1B). Such orientation is helpful because of the triangular Rogallo wing shape. As such, when roller 30 is activated, more "linear length" of fabric must be rolled in (or unrolled) at the trailing edge than at the leading edge, where little or no fabric needs to be rolled up.

In some embodiments, motor 40 is connected to roller 30 by using a direct drive shaft connection. In other embodiments, reduction gears may be used to connect motor 40 to roller 30 to provide more torque as needed. Other embodiments of system 10 may employ other motor connection techniques as recognized by one having ordinary skill in the art.

In some embodiments, motor 40 is a small electric motor that is controlled by signals from a wired connection with control unit 60. In other embodiments, motor 40 may comprise other motor technologies as recognized by one having ordinary skill in the art, such as a small gas motor or a manually operated mechanical drive system. Upon activation, motor 40 causes roller 30 to roll-up or unroll at least a portion of fabric wing 20. As shown in FIG. 1A, fabric wing 20 is in a completely unrolled position. As shown in FIG. 1B, fabric wing 20 is in a partially rolled-up position.

Cables 50 and 52 may be connected to a control unit 60. Control unit 60 may be used to control the operation of motor 40, as well as control other flight and operational aspects of system 10. Examples of control units 60 suitable for use with system 10 are discussed in more detail with reference to FIGS. 5 and 6.

System 10 may include a roller support structure connected to roller 30. As shown in FIGS. 1A and 1B, the roller support structure comprises support members 54 and 56. In some embodiments, support members 54 and 56 are rigid members. In other embodiments, support members 54 and 56 are collapsible or are cables. In some embodiments, support members 54 and 56 are tubular in shape and may contain wiring therein for connecting motor 40 to control unit 60. In further embodiments, support members 54 and 56 comprise cables similar to cables 50 and 52.

Figure 2A:
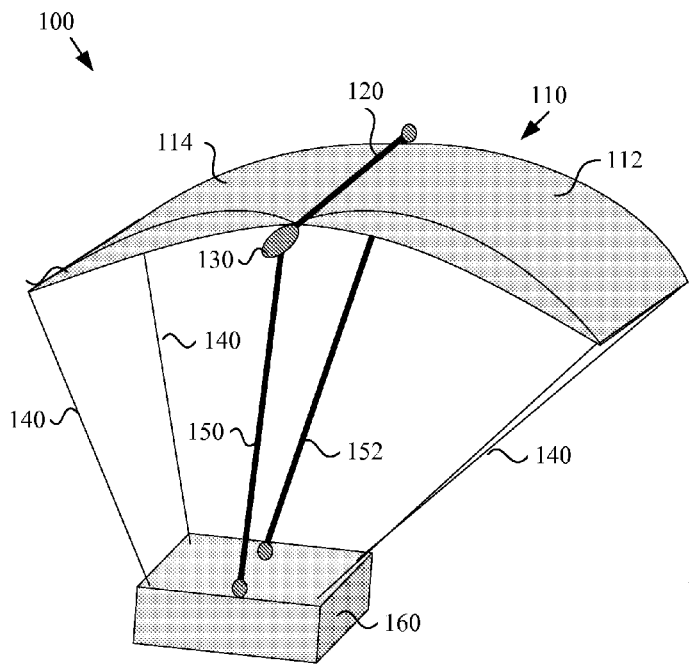
FIGS. 2A and 2B show diagrams of an embodiment of a parafoil wing shaped single roller system in accordance with the Variable Geometry Wing Using a Roll-Up Device.
Figure 2B:
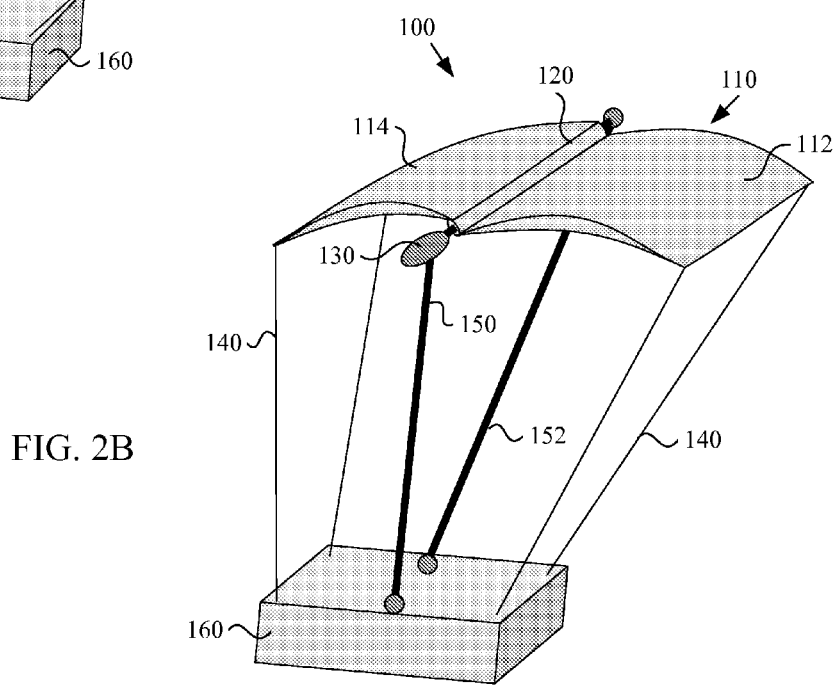

FIGS. 2A and 2B show diagrams of an embodiment of a parafoil wing shaped single roller system 100 in accordance with the Variable Geometry Wing Using a Roll-Up Device. System 100 may include a fabric wing 110 comprising a first portion 112 and a second portion 114, a roller 120 connected to fabric wing 110, cables 140 connected to fabric wing 110, and a motor 130 connected to roller 120. Motor 130 and cables 140 may be configured similarly as components of like name of system 10. As shown in FIG. 2A, fabric wing 110 is in a completely unrolled position. As shown in FIG. 2B, fabric wing 110 is in a partially rolled-up position.

System 100 may include a roller support structure connected to roller 120. As shown in FIGS. 2A and 2B, the roller support structure comprises support members 150 and 152. System 100 further includes a control unit 160 connected to cables 140 and support members 150 and 152. Support members 150 and 152, as well as control unit 160, may be configured similarly as components of like name of system 10.

Figure 3A:
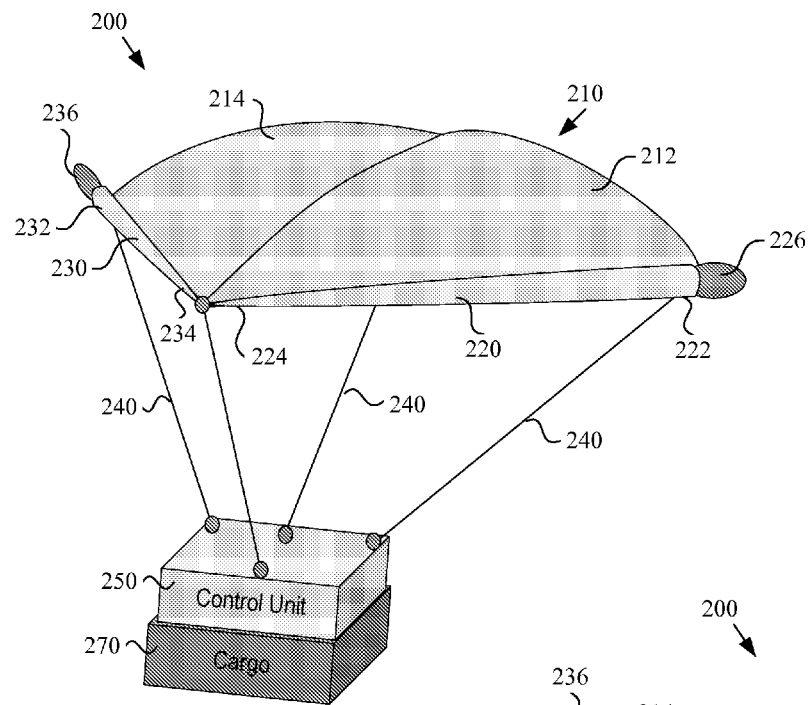
FIGS. 3A and 3B show diagrams of an embodiment of a Rogallo wing shaped double roller system in accordance with the Variable Geometry Wing Using a Roll-Up Device.
Figure 3B:
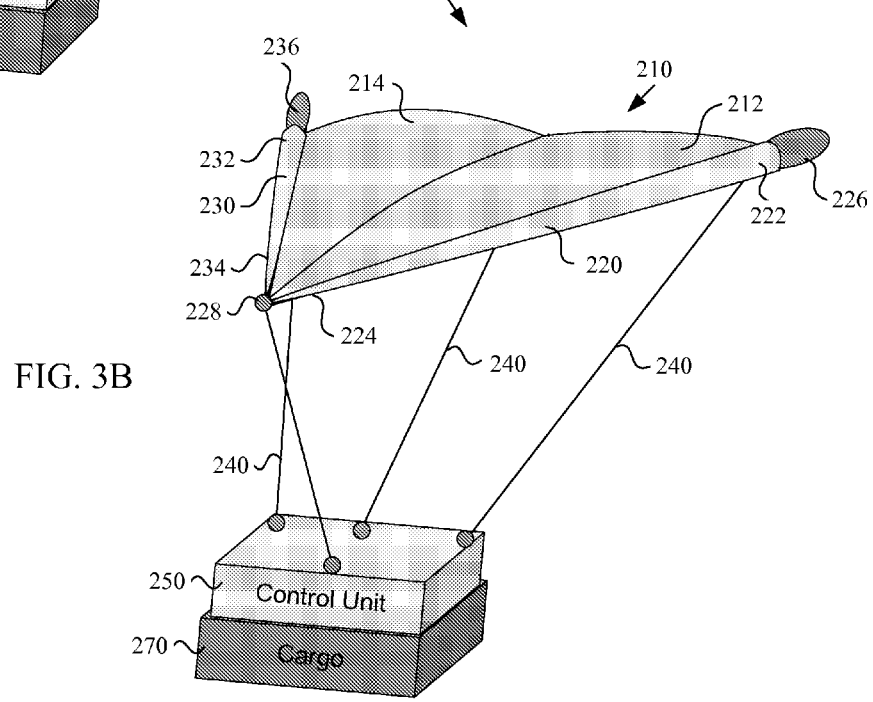

FIGS. 3A and 3B show diagrams of an embodiment of a Rogallo wing shaped double roller system 200 in accordance with the Variable Geometry Wing Using a Roll-Up Device. System 200 may include a fabric wing 210 comprising a first portion 212 and a second portion 214, a first roller 220 connected to a first end of fabric wing 210, a second roller 230 connected to a second end of fabric wing 210, a first motor 226 connected to a first end 222 of first roller 220, a second motor 236 connected to a first end 232 of second roller 230, and cables 240 connected to fabric wing 210.

Motors 226 and 236 and cables 240 may be configured similarly as components of like name of system 10. Upon activation first motor 226 and second motor 236 cause first roller 220 and second roller 230, respectively, to roll-up or unroll at least a portion of fabric wing 210. As shown in FIG. 3A, fabric wing 210 is in a completely unrolled position. As shown in FIG. 3B, fabric wing 210 is in a partially rolled-up position.

First roller 220 may be tapered from its first end 222 to its second end 224. Similarly, second roller 230 may be tapered from its first end 232 to its second end 234. Second end 224 and second end 234 are connected by a hinge 228, allowing first roller 220 and second roller 230 to move with respect to each other from a fixed point and to evenly and uniformly roll up or unroll fabric wing 210.

Cables 240 may be connected to a control unit 250. Control unit 250 may be used to control the operation of first motor 226 and second motor 236, as well as control other flight and operational aspects of system 200 in a manner similar to system 10. Examples of control units 250 suitable for use with system 200 are discussed in more detail with reference to FIGS. 5 and 6. System 200 may further include cargo 270 attached to control unit 250. Cargo 270 may comprise various payload items intended to be delivered to a target. Examples of cargo 270 include, but are not limited to, vehicles, crates containing food, medical, and/or other military critical supplies, weapons, and personnel.

System 200 may include a roller support structure connected to rollers 220 and 230. In some embodiments, the roller support structure may comprise three support members configured similarly to those described with respect to system 10. As an example, one support member may be connected to control unit 250 and first end 222, one support member may be connected to control unit 250 and hinge 228, and one support member may be connected to control unit 250 and first end 232.

Figure 4A:
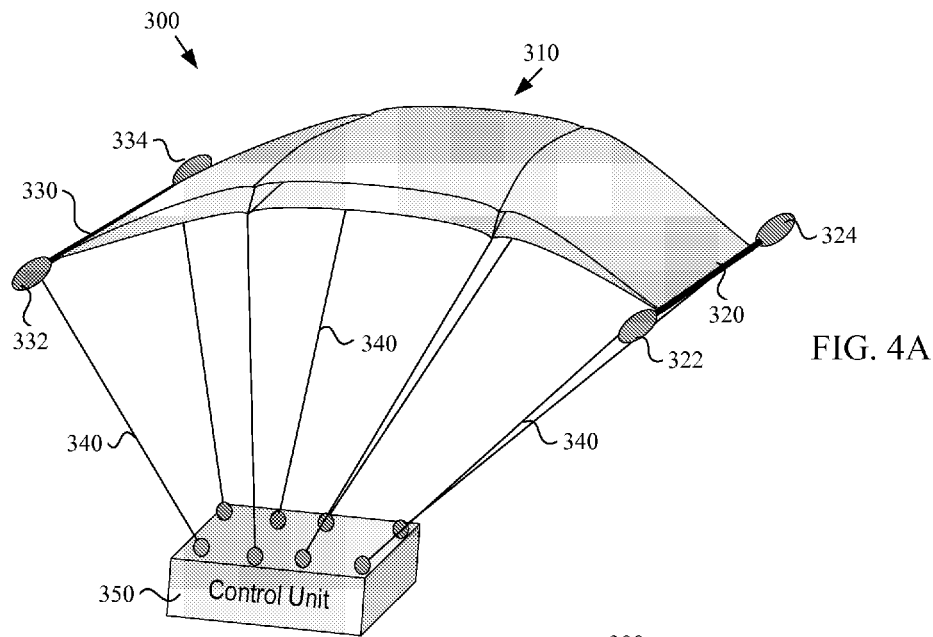
FIGS. 4A and 4B show diagrams of an embodiment of a parafoil wing shaped double roller system in accordance with the Variable Geometry Wing Using a Roll-Up Device.
Figure 4B:
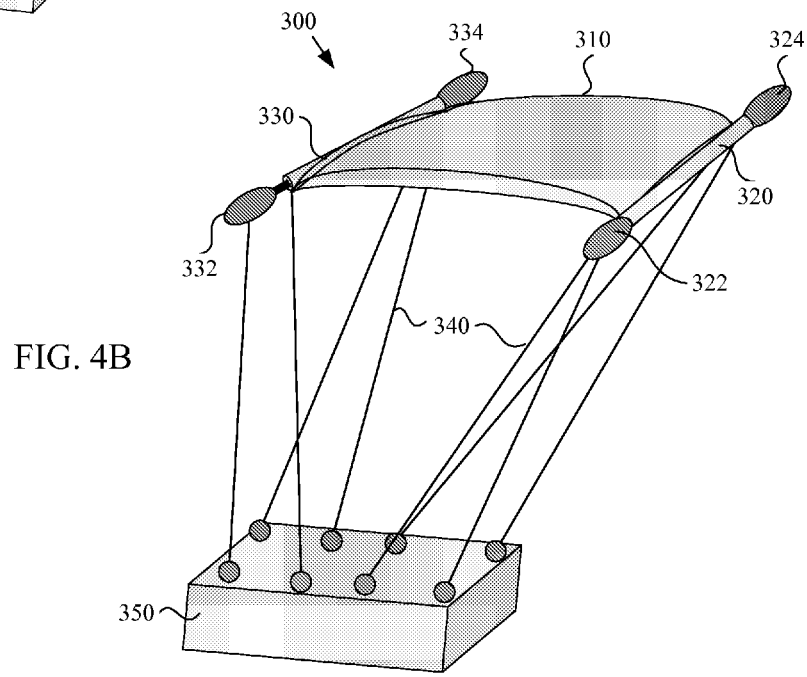

FIGS. 4A and 4B show diagrams of an embodiment of a parafoil wing shaped double roller system 300 in accordance with the Variable Geometry Wing Using a Roll-Up Device. System 300 may include a fabric wing 310, a first roller 320 connected to a first end of fabric wing 310, a second roller 330 connected to a second end of fabric wing 310, a first motor 322 and a second motor 324 connected to first roller 220, a third motor 332 and a fourth motor 334 connected to second roller 230, and cables 340 connected to fabric wing 310.

Motors 322, 324, 332, and 334, as well as cables 340 may be configured similarly as components of like name of system 100. Upon activation, first motor 322 and second motor 324 cause first roller 320, and third motor 332 and fourth motor 334 cause second roller 330, to roll-up or unroll at least a portion of fabric wing 310. As shown in FIG. 4A, fabric wing 310 is in a completely unrolled position. As shown in FIG. 4B, fabric wing 310 is in a partially rolled-up position.

Cables 340 may be connected to a control unit 350. Control unit 350 may be used to control the operation of motors 322, 324, 332, and 334, as well as control other flight and operational aspects of system 300. Examples of control units 350 suitable for use with system 300 are discussed in more detail with reference to FIGS. 5 and 6. System 300 may further include cargo (not shown) attached to control unit 350. Such cargo may be cargo similar to that described with respect to system 200.

System 300 may include a roller support structure connected to rollers 320 and 330. In some embodiments, the roller support structure may comprise four support members configured similarly to those described with respect to system 100. As an example, one support member may be connected to control unit 350 and one end of roller 320, one support member may be connected to control unit 350 and the other end of roller 320, one support member may be connected to control unit 350 and one end of roller 330, and one support member may be connected to control unit 350 and the other end of roller 330.

In the double roller configuration as shown in FIGS. 4A and 4B, the rollers are located at the wing tips of fabric wing 310. Such a configuration results in fabric wing 310 being shortened or lengthened when the rollers 320 and 330 are operated. When fabric wing 310 is rolled up, it has a lower aspect ratio, less area, and less drag, which allows better high speed operation. Conversely, when fabric wing 310 is fully unrolled, it has more wing area and provides more lift at low speeds. In the double roller configuration the wing tips are rigid, and therefore less subject to aerodynamic flutter. To achieve pitch and roll control, cables 340 attached to rollers 320 and 330 may be either lengthened or shortened.

Figure 5:
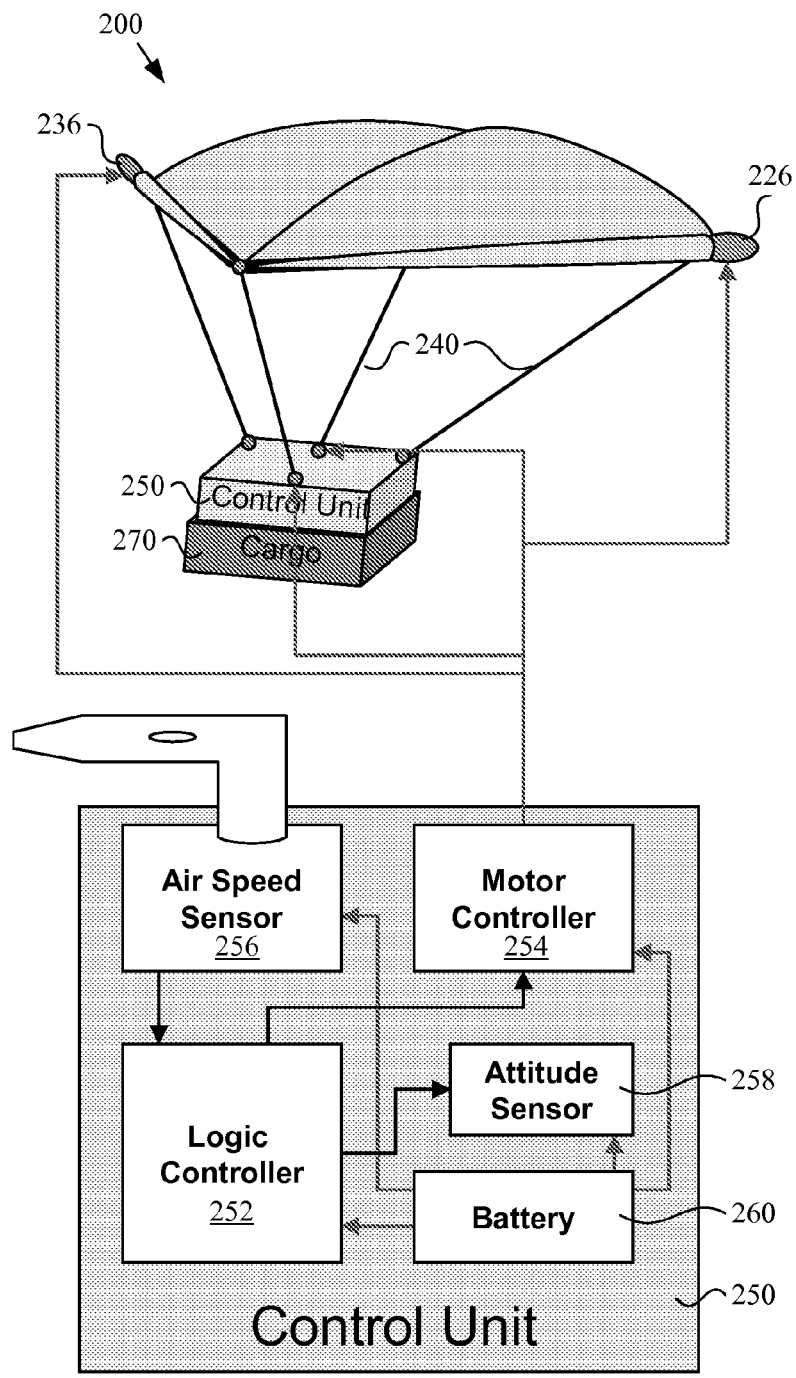
FIG. 5 shows a diagram of an embodiment of a control unit for use with a system in accordance with the Variable Geometry Wing Using a Roll-Up Device.

FIG. 5 shows a diagram of an embodiment of a control unit for use with a system in accordance with the Variable Geometry Wing Using a Roll-Up Device. Shown in FIG. 5 is control unit 250 for use with system 200. However, it should be recognized that a control unit similarly configured to control unit 250 may be used with systems 10, 100, and 300 as discussed herein. Minor modifications to control unit 250 may be made to account for an increase number of motors, cables, and rollers, such modifications including both software and hardware modifications.

Control unit 250 may include a logic controller 252, a motor controller 254 connected to logic controller 252, an air speed sensor 256 connected to logic controller 252, an altitude sensor 258 connected to logic controller 252, and a power source 260 connected to logic controller 252. In some embodiments, power source 260 is a battery pack. Motor controller 254 may be used to control the operation of motors such as motors 226 and 236. Motor controller 254 may also control the operation of smaller motors connected to cables 240 to lengthen or shorten cables 240 to achieve pitch and roll control. Data from air speed sensor 256 and altitude sensor 258 may be used by logic controller 252 to determine the speed of system 200 and to appropriately modify the speed of system 200 to ensure safe delivery of cargo 270 at a target destination.

Figure 6:
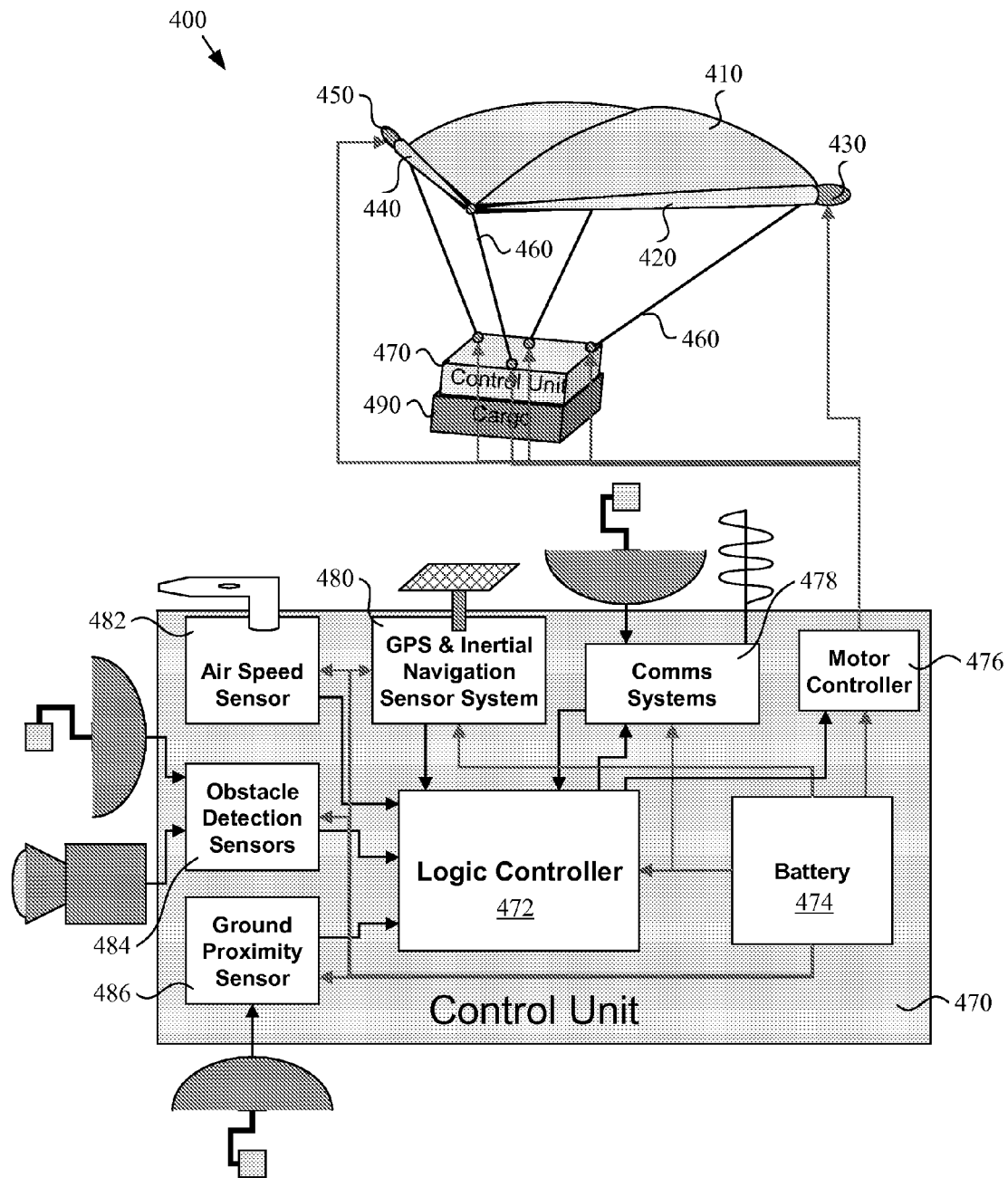
FIG. 6 shows a diagram of another embodiment of a control unit for use with a system in accordance with the Variable Geometry Wing Using a Roll-Up Device.

FIG. 6 shows a diagram of another embodiment of a control unit 470 for use with a system 400 in accordance with the Variable Geometry Wing Using a Roll-Up Device. System 400 may be configured similarly to system 200, including a fabric wing 410, rollers 420 and 440 with attached motors 430 and 450, respectively, cables 460, and cargo 490.

Control unit 470 may include a logic controller 472 and various components connected to logic controller 472, such as: a power source 474, a motor controller 476, communications systems 478, a GPS and inertial navigation sensor system 480, an air speed sensor 482, obstacle detection sensors 484, and a ground proximity sensor 486. Communications systems 478 may include a two-way radio for reporting the position and status of the system to the recipient of the cargo on the ground and/or to a ground control station, and for receiving control or navigation commands from a ground station or the recipient of the cargo on the ground.

Communications systems 478 may also include a high-frequency communications capability such as satellite communications for sending and/or receiving high-data-rate signals such as imagery from the sensors onboard unit 400. Obstacle detection sensors 484 may be used to by logic controller 472 to ensure that system 400 does not collide with other airborne or ground-based obstacles. Obstacle detection sensors 484 may include radar of various types, optical systems such as infrared or electro-optical sensors, acoustic sensors, etc. Ground proximity sensor 486 may be used to determine the altitude above ground to enable flying at a predetermined height above the ground ("terrain following") or to detect the distance to the ground during landing so that the wing attitude and geometry can be changed to yield a gentle landing.

It should be appreciated by one having ordinary skill in the art that a greater or fewer amount of sensors, or sensor types, may be included within control unit 470, depending upon the desired functionality of system 400. The various sensors and components of control unit 470 having the same names as those discussed with respect to control unit 250, may be configured similarly to those sensors and components of control unit 250.

Many modifications and variations of the Variable Geometry Wing Using a Roll-Up Device are possible in light of the above description. Within the scope of the appended claims, the embodiments of the systems described herein may be practiced otherwise than as specifically described. The scope of the claims is not limited to the implementations and embodiments disclosed herein, but extends to other implementations and embodiments as may be contemplated by those having ordinary skill in the art.

I claim:

1. A system comprising:
   a fabric wing comprising a first portion and a second portion;
   a roller connected to the first portion and the second portion;
   a first rigid tube connected to the roller by a hinge and to the leading edge of the first portion;
   a second rigid tube connected to the roller by the hinge and to the leading edge of the second portion;
   more than one cables connected to the fabric wing;
   a control unit connected to the more than one cables and suspended from the fabric wing, the control unit comprising a logic controller and a power source, a motor controller, and at least one sensor all connected to the logic controller; and
   a motor connected to the roller, wherein upon activation the motor causes the roller to roll-up or unroll the first portion and the second portion.

2. The system of claim 1 further comprising a roller support structure connected to the roller.

3. The system of claim 2, wherein the roller support structure comprises a first member connected to one end of the roller and a second member connected to the other end of the roller.

4. The system of claim 3, wherein the first member and the second member are rigid.

5. The system of claim 2, wherein the roller support structure is collapsible.

6. The system of claim 1, wherein the roller is located along a central axis of the fabric wing.

7. The system of claim 1, wherein the roller is located at one end of the fabric wing.

8. The system of claim 1, wherein the at least one sensor is selected from the group of sensors consisting of an air speed sensor, an altitude sensor, an obstacle detection sensor, and a ground proximity sensor.

9. The system of claim 1, wherein the control unit further comprises:
   a global positioning system and inertial navigation sensor system connected to the logic controller; and
   a communications system connected to the logic controller.

10. The system of claim 1, wherein the fabric wing is a parafoil.

11. The system of claim 1, wherein the fabric wing is a Rogallo wing.

12. The system of claim 1, wherein the roller is tapered from a first end to a second end, wherein the motor is connected to the first end of the roller.

13. The system of claim 1, wherein an end of the first portion is connected to the bottom portion of the roller and an end of the second portion is connected to the top portion of the roller.

14. A system comprising:
   a fabric wing;
   a first roller connected to a first end of the fabric wing, the first roller tapered from a first roller first end to a first roller second end;
   a second roller connected to a second end of the fabric wing, the second roller tapered from a second roller first end to a second roller second end, wherein the second roller second end is connected to the first roller second end by a hinge;
   a first motor connected to the first roller first end;
   a second motor connected to the second roller first end; and
   more than one cables connected to the fabric wing
   wherein upon activation the first motor and the second motor cause the first roller and second roller, respectively, to roll-up or unroll at least a portion of the fabric wing.

15. The system of claim 14 further comprising a control unit connected to the more than one cables and suspended from the fabric wing, the control unit comprising:
   a logic controller;
   a power source connected to the logic controller;
   a motor controller connected to the logic controller; and
   at least one sensor connected to the logic controller.

16. The system of claim 15, wherein the at least one sensor is selected from the group of sensors consisting of an air speed sensor, an altitude sensor, an obstacle detection sensor, and a ground proximity sensor.

17. The system of claim 15, wherein the control unit further comprises:
   a global positioning system and inertial navigation sensor system connected to the logic controller; and
   a communications system connected to the logic controller.

18. A system comprising:
   a fabric wing having a parafoil wing shape;
   a first roller connected to a first end of the fabric wing;
   a second roller connected to a second end of the fabric wing;
   a first motor connected to an end of the first roller;
   a second motor connected to an end of the second roller;
   more than one cables connected to the fabric wing; and
   a control unit connected to the more than one cables and suspended from the fabric wing, the control unit comprising
       a logic controller,
       a power source connected to the logic controller,
       a motor controller connected to the logic controller, and
       at least one sensor connected to the logic controller
   wherein upon activation the first motor and the second motor cause the first roller and second roller, respectively, to roll-up or unroll at least a portion of the fabric wing.

19. The system of claim 18, wherein the at least one sensor is selected from the group of sensors consisting of an air speed sensor, an altitude sensor, an obstacle detection sensor, and a ground proximity sensor.

20. The system of claim 18, wherein the control unit further comprises:
   a global positioning system and inertial navigation sensor system connected to the logic controller; and
   a communications system connected to the logic controller.

21. The system of claim 18 further comprising:
   a third motor connected to the other end of the first roller; and
   a fourth motor connected to the other end of the second roller.

* * * * *